United States Patent [19]
Abramson

[11] Patent Number: 5,991,304
[45] Date of Patent: Nov. 23, 1999

[54] METHOD AND APPARATUS FOR MINIMIZING ASYNCHRONOUS TRANSMIT FIFO UNDER-RUN AND RECEIVE FIFO OVER-RUN CONDITIONS

[75] Inventor: Darren L. Abramson, Folsom, Calif.

[73] Assignee: Intel Corporation, Santa Clara, Calif.

[21] Appl. No.: 09/023,394

[22] Filed: Feb. 13, 1998

[51] Int. Cl.$^6$ .................................................. H04L 12/00
[52] U.S. Cl. ........................................... 370/413; 370/429
[58] Field of Search ................................... 370/412–417, 370/428, 429

[56] References Cited

U.S. PATENT DOCUMENTS 4,907,225  3/1990  Gulick et al. ........................... 370/94.1

*Primary Examiner*—Melvin Marcelo
*Attorney, Agent, or Firm*—Blakely, Sokoloff, Taylor & Zafman LLP

[57] ABSTRACT

A circuit adapted to a first-in/first-out device ("FIFO") is disclosed. The circuit includes a counter and a first end of packet detector that is coupled to the counter. The first end of packet detector increments the counter if an end of packet is detected at an input of the FIFO. The circuit also includes a second end of packet detector coupled to the counter. The second end of packet detector decrements the counter if an end of packet is detected at an output of the FIFO. A detector circuit is coupled to an output of the counter and requests a bus transaction in response to the output of the counter. In another aspect, the present invention is a method of preventing data over-run errors in a receive FIFO having an input and an output. The method includes the steps of monitoring an input of the receive FIFO to determine a number of data packets received, monitoring an output of the receive FIFO for an end of packet to determine a number of data packets drained, and asserting a busy acknowledge line if the difference between the number of data packets received and the number of data packets drained is greater than and alternatively equal to a predetermined value.

30 Claims, 4 Drawing Sheets

METHOD AND APPARATUS FOR MINIMIZING ASYNCHRONOUS TRANSMIT FIFO UNDER-RUN AND RECEIVE FIFO OVER-RUN CONDITIONS

BACKGROUND OF THE INVENTION

1. Field of the Invention

The present invention relates generally to the field of computer systems, and specifically, to a method and apparatus for minimizing asynchronous transmit FIFO under-run and receive FIFO over-run conditions.

2. Background Information

A general purpose computer system typically includes a processor, memory, and one or more peripheral devices coupled together by one or more buses. Recently, serial peripheral buses (e.g., a universal serial bus "USB", a 1394 serial bus, IEEE 1394-1995 High Performance Serial Bus IEEE, 1995, etc.) have become increasingly popular in computer systems mainly because they offer a low cost, high performance alternative to other bus architectures. A serial bus architecture typically includes transmit and receive first-in/first-out devices ("FIFOs"), an interface module which interfaces between the computer system bus and the FIFOs, and a serial interface module that operates as an interface between the serial bus (and one or more peripheral devices on the serial bus) and the FIFOs. These serial buses transmit and receive asynchronous data as well as isochronous data depending on the peripheral device coupled to the serial bus. Asynchronous transmission places emphasis on guaranteed delivery of data over guaranteed timing whereas isochronous transmission places emphasis on guaranteed timing of data over delivery of data.

For data transmission, the host processor creates a context program in memory, the context program including data and commands. The commands direct how the data is to be assembled for transmission, the destination of the data packets, etc. The interface module retrieves the commands and data packets from memory and places them into the transmit FIFO. However, before data can be read from memory, the interface module must request access to gain control of the system bus. The time that it takes to gain control (referred to as "system bus latency") of the system bus is non-deterministic and depends on several factors including the bus speed, the number of devices requesting access to gain control of the bus, and the like.

As soon as data is placed in the transmit FIFO, transmit FIFO control circuitry requests to transmit the data on the serial bus. Similarly, the time that it takes for a serial bus grant (referred to as "serial bus latency") is non-deterministic and depends on a number of factors including the serial bus speed, the number of serial peripheral devices on the serial bus, and the amount of isochronous traffic. Once access is granted, the data is transmitted on the serial bus. If the data packet size to be transmitted is greater than the transmit FIFO size, portions (or the balance) of the data packet must be retrieved from memory as the data is drained from the transmit FIFO onto the serial bus. However, if the system bus latency for retrieving the balance of the data packet is greater than the time that it takes to drain the transmit FIFO, an under-run condition will occur. The chances of an under-run condition occurring rapidly increases in a computer system having a heavy traffic on the system bus. An under-run condition is undesirable because it wastes serial bus bandwidth, thus slowing the system down.

Accordingly, there is a need in the technology for a method and apparatus to minimize/prevent an asynchronous transmit FIFO under-run condition due to system latencies.

Data that is received from a peripheral device on the serial bus in a receive FIFO is placed in memory for processing by the processor. In this case, if data is not placed in memory fast enough, a data over-run condition may occur (i.e., when data is received by a full FIFO to cause data already in the FIFO to be overwritten). The depth of the receive FIFO is one factor in determining the system bus latency that the FIFO can handle without an over-run condition occurring. The issue of system bus latency is exacerbated by the fact that the interface module may need to fetch commands from memory prior to being able to write data from the receive FIFO into memory. That is, a typical asynchronous packet may require a command fetch, data storage, and status write-back, all to different locations in memory. If many small asynchronous packets are received in the receive FIFO, the system bus latency required to fetch commands from and complete the status write-back to memory may greatly exceed the time required to drain the data from the receive FIFO.

Accordingly, there is a further need in the technology for a method and apparatus to eliminate over-run conditions in a receive FIFO.

SUMMARY OF THE INVENTION

In one embodiment, the present invention is a circuit adapted to a first-in/first-out device ("FIFO"). The circuit includes a counter and a first end of packet detector that is coupled to the counter. The first end of packet detector increments the counter if an end of packet is detected at an input of the FIFO. The circuit also includes a second end of packet detector coupled to the counter. The second end of packet detector decrements the counter if an end of packet is detected at an output of the FIFO. A detector circuit is coupled to an output of the counter and requests a bus transaction in response to the output of the counter.

BRIEF DESCRIPTION OF THE DRAWINGS

The features and advantages of the present invention will become apparent from the following detailed description of the present invention in which.

DESCRIPTION OF THE PREFERRED EMBODIMENT

In the following description, for purposes of explanation, numerous details are set forth in order to provide a thorough understanding of the present invention. However, it will be apparent to one skilled in the art that these specific details are not required in order to practice the present invention. As discussed herein, a "computer system" is a product including circuitry capable of processing data. The computer system may include, but is not limited or restricted to, a conventional computer (e.g., laptop, desktop, palmtop, server, mainframe, etc.), hard copy equipment (e.g., printer, plotter, scanner, fax machine, etc.), banking equipment (e.g., an automated teller machine), wireless communication equipment, and the like.

Figure 1:
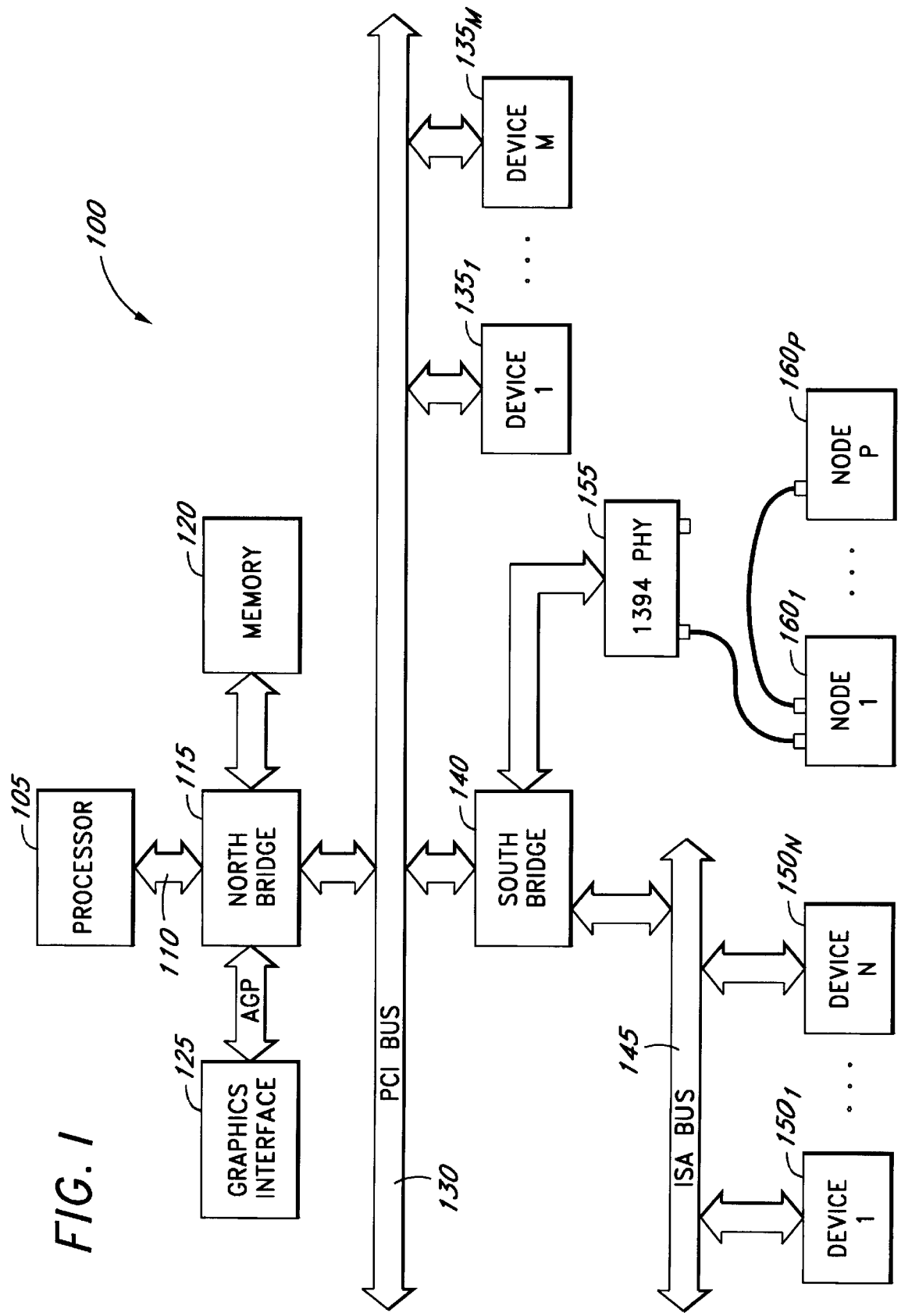
FIG. 1 illustrates an exemplary computer system suitable for use with the present invention.

FIG. 1 illustrates an exemplary computer system 100 suitable for use with the present invention. The computer system 100 includes a processor 105 coupled to a host bridge 115 (hereinafter referred to as a "north bridge") by way of host bus 110. Processor 105 may be any type of processor such as a microcontroller or a general purpose microprocessor. In the embodiment shown, the north bridge 115 is a host-to-peripheral component interconnect ("PCI") bridge, although other bridges may be used in lieu thereof. The north bridge 115 is coupled to a system memory 120 (e.g., dynamic random access memory "DRAM", static RAM "SRAM", etc.), PCI bus 130, and a graphics interface 125. The north bridge 115 is responsible for bridging processor transactions to either system memory 120, PCI bus 130, or graphics interface 125. The north bridge 115 also bridges graphics interface 125 or PCI mastered transactions to system memory 120 while initiating processor 105 cache snoop cycles.

The PCI bus 130 provides a communication path between processor 105 or system memory 120 and one or more peripheral devices $135_1$–$135_M$ (e.g., a network interface card, a SCSI controller card, etc.), where "M" is a positive whole number. The PCI bus 130 further provides a communication path between the processor 105 or system memory 120 and a second bridge 140 (hereinafter referred to as a "south bridge").

In one embodiment, the south bridge 140, among other things, serves two major purposes. First, the south bridge 140 bridges transactions between the PCI bus 130 and an expansion bus 145. In the embodiment shown, the expansion bus 145 is an industry standard architecture ("ISA") bus, although any other type of bus architectures may be used in lieu thereof. The expansion bus 145 provides a communication path between the PCI bus 130 and a plurality of expansion peripheral devices $150_1$–$150_N$ (e.g., a disk drive controller, a sound card, a modem, a serial and parallel port controller, etc.), where "N" is a positive whole number.

Second, the south bridge 140 bridges transactions from the PCI bus 130 and a serial bus 160. In the preferred embodiment, the serial bus is a 1394 serial bus in accordance with "IEEE 1394-1995 High Performance Serial Bus", published in 1995, although any other serial bus architecture may be used. The south bridge 140 is coupled to a 1394 physical interface 155. The physical interface 155 is coupled to a plurality of nodes $160_1$–$160_P$ (where "P" is a positive whole number). It is to be appreciated by one skilled in the art that the specific architecture of the computer system 100 is not critical in practicing the present invention, as variations may be made to the computer system 100 without departing from the spirit and scope of the present invention.

Figure 2:
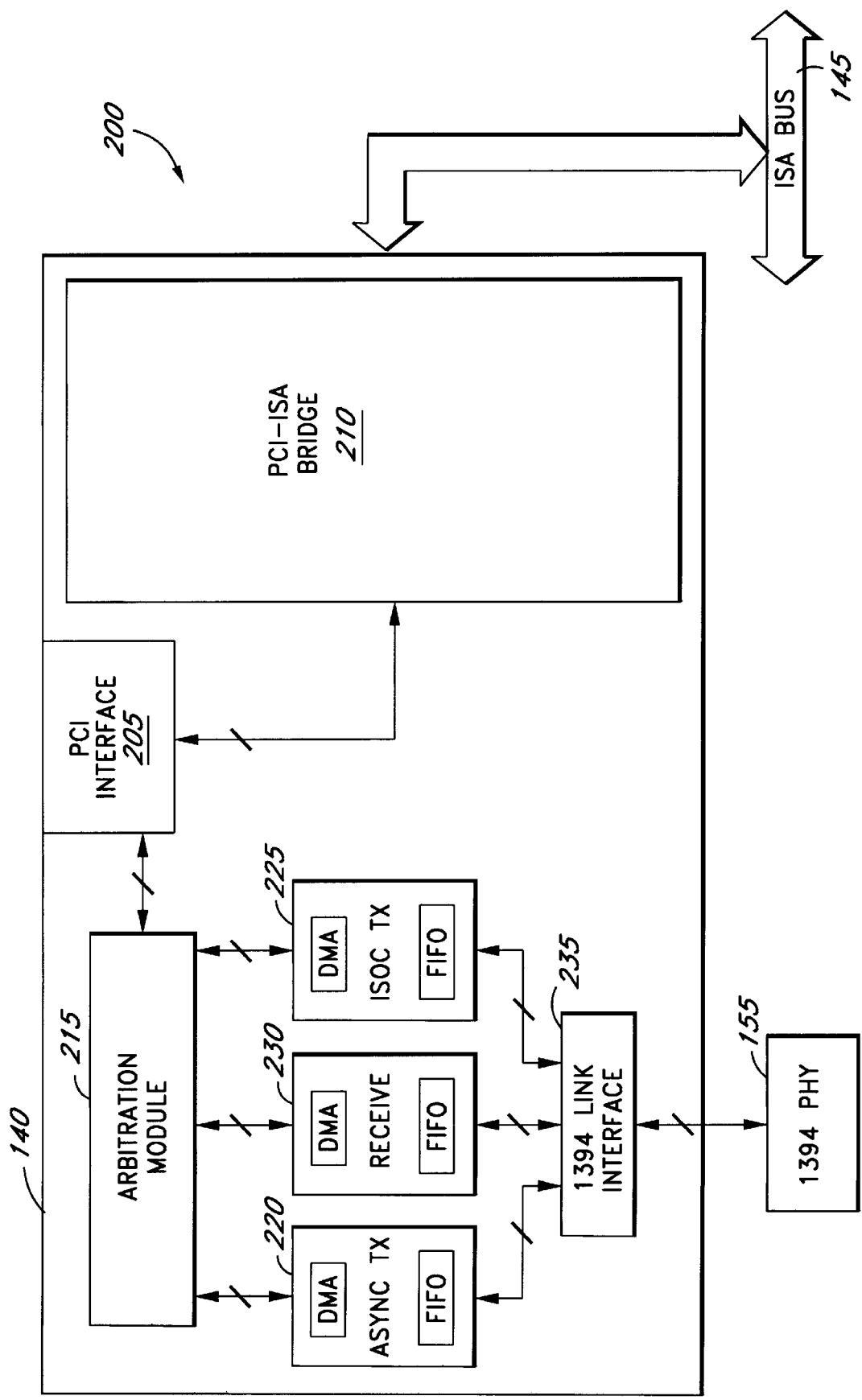
FIG. 2 illustrates an embodiment of the south bridge in accordance to the teachings of the present invention.

FIG. 2 illustrates an embodiment of the south bridge 140 in accordance to the teachings of the present invention. Referring to FIGS. 1 and 2, the south bridge 140 includes a PCI interface module 205 which interfaces with a PCI-to-ISA bridge 210 and an arbitration module 215. The PCI-to-ISA bridge 210 allows transactions between one or more expansion peripheral devices $150_1$–$150_N$ and devices coupled to the PCI bus 130, processor 105, and system memory 120. The arbitration module 215 is coupled to asynchronous transmit module 220 (referred to as "ATX module"), isochronous transmit module 225 (referred to as "ITX module"), and receive module 230. The arbitration module 215 performs the necessary arbitration between ATX, ITX, and receive modules 220, 225, and 230 to access the PCI bus 130.

The ATX, ITX, and receive modules 220, 225, and 230 are coupled to a 1394 link interface 235 which provides the necessary interface to the 1394 serial bus. In one embodiment, the 1394 link interface 235 serializes and de-serializes data streams. The 1394 link interface 235 is coupled to the physical link interface 155 which is connected to the 1394 serial bus. In particular, the ATX module 220 transmits asynchronous data packets to peripheral devices on the 1394 serial bus while the ITX module 225 transmits isochronous data packets to peripheral devices on the 1394 serial bus. The receive module 230, on the other hand, receives both asynchronous and isochronous data packets from peripheral devices on the 1394 serial bus. In another implementation, separate asynchronous and isochronous receive modules may be used. Asynchronous transmission places emphasis on guaranteed delivery of data over guaranteed timing whereas isochronous transmission places emphasis on guaranteed timing of data over delivery of data. An example of an isochronous serial peripheral device is a digital camera used for video conferencing. If an isochronous data packet is lost (for any reason), it cannot be re-transmitted whereas if an asynchronous data packet is lost, it can be re-transmitted. Therefore, it is more important to assure that isochronous data packets are not lost or missed.

Figure 3:
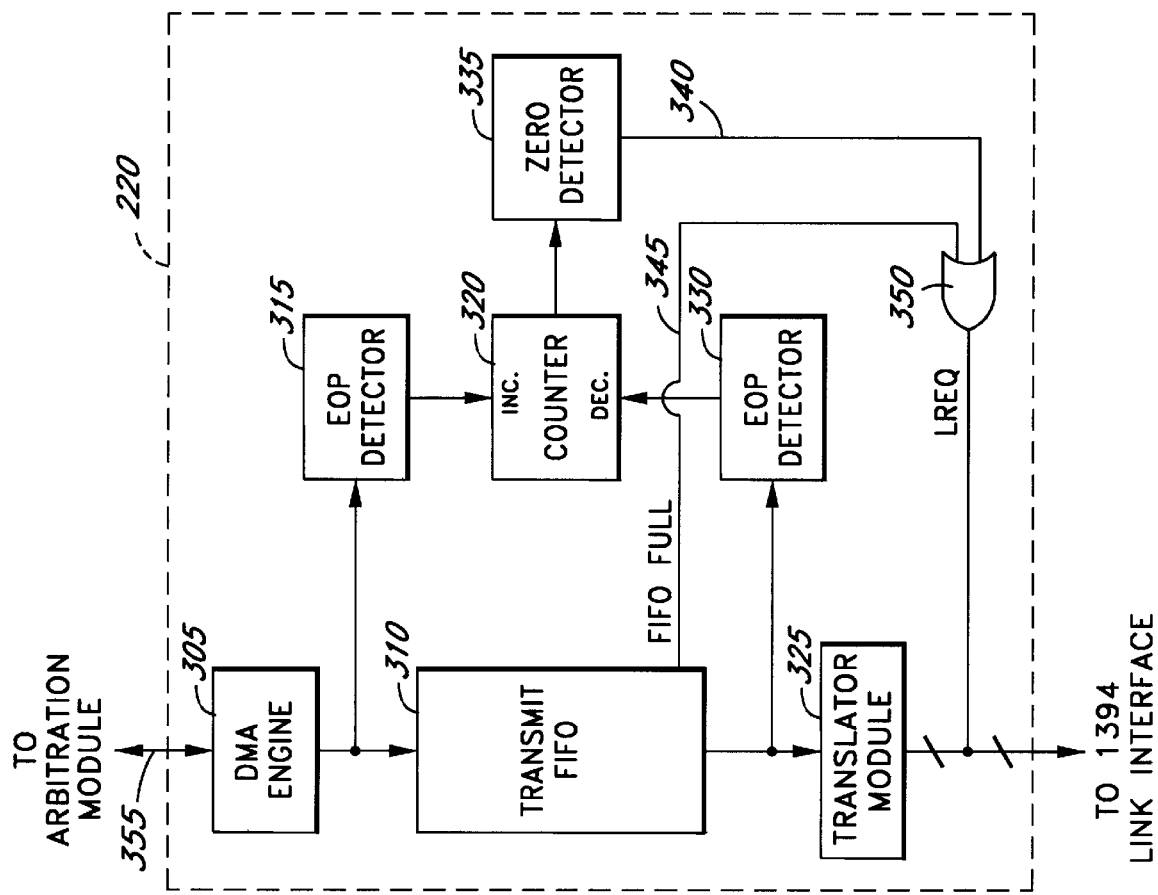
FIG. 3 illustrates one embodiment of an asynchronous transmit module of the present invention.

FIG. 3 illustrates one embodiment of an asynchronous transmit module of the present invention. Referring to FIGS. 1–3, the ATX module 220 includes a direct memory access ("DMA") engine 305 coupled to a transmit FIFO 310 and the arbitration module 215 of FIG. 2 by way of address, data, and control signal lines 355. In one embodiment, the transmit FIFO 310 is four bytes wide (referred to as a "quadlet" of data) and 1 kilo bytes deep, although other arrangements may be used in lieu thereof. For data transmission to a peripheral device on the serial bus, the processor 105 of FIG. 1 creates a context program in memory 120 consisting of command descriptors and data packets. The processor 105 then writes to an internal register of the DMA engine 305 which causes the DMA engine 305 to retrieve the command descriptors and data packets from memory 120. The DMA engine 305 asserts a request line (one of the signal lines 355) to the arbitration unit 215 to request access to the PCI bus 130. Once the request is granted by the PCI bus arbiter (e.g., the north bridge 115), the DMA engine 305 fetches the command descriptors and data packets from system memory 120 and places them in the transmit FIFO 310. However, the transmit FIFO 310 does not request access to transmit the data on the serial bus at this time, as will be explained in greater detail below.

The DMA engine 305 is also coupled to a first end of packet ("EOP") detector 315 which is in turn coupled to a counter 320. The first EOP detector 315 monitors the data placed in the transmit FIFO 310. Once an end of packet marker is detected, the first EOP detector 315 increments the counter 320 by one. The output of the transmit FIFO 310 is coupled to a second EOP detector 330 with an output of the second EOP detector 330 being coupled to the counter 320. The second EOP detector 330 monitors the data drained from the transmit FIFO 310. Once an end of packet marker is drained from the transmit FIFO 310, the second EOP detector 330 decrements the counter 320. In one embodiment, the first and second EOP detectors 415 and 330 detect an end of packet by reading a packet header to obtain the packet size and counting the number of units of data that pass through the transmit FIFO 310. The output of the transmit FIFO is also coupled to a translation module 325 which provides data bus width translations. For example, the translation module 325 translates data buses having different data widths (e.g., quadlet to byte bus width translations). The translation module 325 is coupled to the 1394 link interface 235 and provides the data to the link interface 235 for transmission.

The output of the counter 320 is coupled to a zero detector circuit 335. As long as the output of the counter 320 is greater than zero, the zero detector circuit 335 asserts a signal on signal line 340 which indicates that at least one complete packet (or at least an end portion thereof) is fully contained in the transmit FIFO 310. The signal line 340 is coupled to one input of an OR gate 350. The output of the OR gate 350 is a link request line ("LREQ") which signals to the 1394 link interface 235 of FIG. 2 to request access to the 1394 serial bus. Thus, with the present invention, a request to transmit data on the serial bus is gated until an entire data packet is contained in the transmit FIFO 310 to eliminate system bus latencies, as described in the background section above.

Moreover, the transmit FIFO 310 includes a FIFO FULL signal on signal line 345 which is coupled to a second input of the OR gate 350. The FIFO FULL signal indicates that the transmit FIFO 310 is "full" (i.e., filled beyond a predetermined threshold such as 75%, 90%, etc.). In this configuration, the LREQ signal is asserted when the FIFO is "full". In one embodiment, data in and data out pointer registers may be used as markers to track whether the transmit FIFO 310 is "full". This gives the DMA engine 305 the maximum amount of time to fetch the rest of the data packet from memory before a data under-run condition occurs. Once the request for transmission on the 1394 serial bus is granted, the DMA engine 305 continues to attempt to keep the transmit FIFO 310 "full" or up to the point where the data packet is completely contained therein.

Thus, the LREQ signal line is gated until either the transmit FIFO 310 is "full" or the data packet to be transmitted is completely contained within the transmit FIFO 310. Gating LREQ in this manner minimizes the possibility that when an asynchronous packet is transmitted on the serial bus, an under-run condition will exist. In addition, the present invention allows asynchronous transmit FIFO fills to be independent of the system bus latency until transmission begins on the 1394 serial bus. As such, the south bridge 140 achieves a maximum 1394 serial bus utilization under medium to heavily loaded PCI conditions without dropping large asynchronous data packets. Moreover, the wasting of 1394 bandwidth is minimized when a PCI or any other bus cannot keep up with the 1394 serial bus. The present invention also enables low-priority filling of the transmit FIFO 310 without a 1394 bus request being sent which maximizes PCI bus bandwidth.

Figure 4:
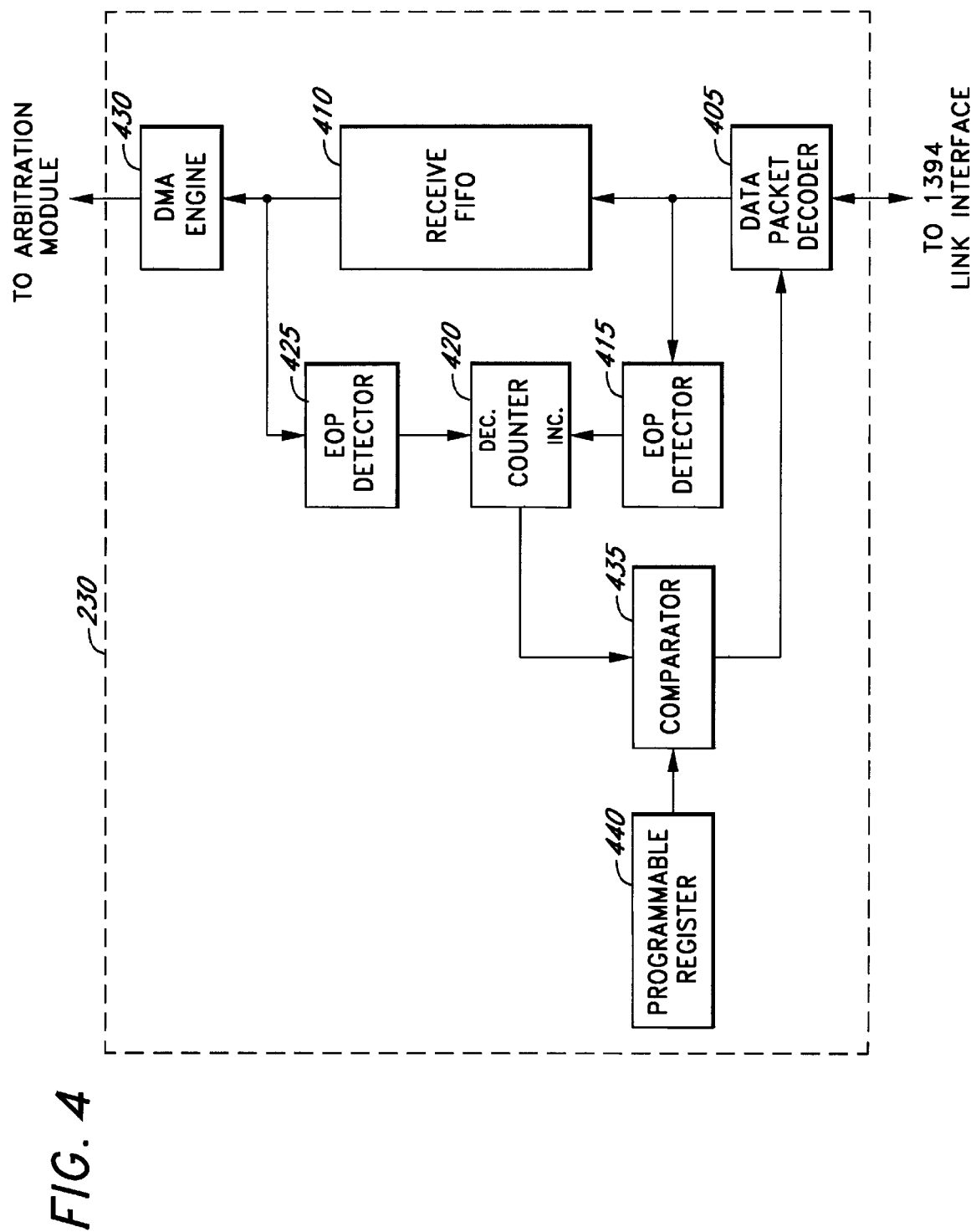
FIG. 4 illustrates one embodiment of a receive module of the present invention.

FIG. 4 illustrates one embodiment of a receive module 230 of the present invention. In this aspect of the present invention, the receive module 230 maintains a receive FIFO in a state to maximize the probability that a large incoming data packet (e.g., an isochronous data packet) will not over-run the receive FIFO. This objective is met by creating a programmable upper bound value in a register for the number of asynchronous packets allowed in the receive FIFO, and rejecting asynchronous packets once this upper bound is exceeded. In one embodiment, the receive module 230 is used for both asynchronous and isochronous data streams.

Referring to FIG. 4, the receive module 230 includes a data packet decoder 405 which is coupled to the physical link interface 235 of FIG. 2. The data packet decoder 405 decodes data packets received from the 1394 serial bus and determines whether the data packets are addressed to the receive module 230. If the data packets are addressed to the receive module 230, the data packet decoder 405 forwards the data packets to a receive FIFO 410, otherwise the data packets are ignored. In one embodiment, the receive FIFO 410 is a quadlet of data wide and two kilo-bytes deep, although other arrangements are possible.

The receive FIFO 410 receives asynchronous and isochronous data packets from the 1394 serial bus. Once data is received in the receive FIFO 410, a receive DMA engine 430 requests to access the PCI bus 130 and drain the receive FIFO 410 in memory 120. The data packet decoder 405 is also coupled to a first EOP detector 415 which is coupled to a counter 420. When the first EOP detector 415 detects an end of packet received, it increments the counter 420 by one to indicate that an entire packet (or an end portion thereof) was received by the receive FIFO 410. The output of the receive FIFO 410 is coupled to a second EOP detector 425 which is also coupled to the counter 420. The second EOP detector 425 monitors the data packets drained from the receive FIFO 410 for an end of packet. Each time an asynchronous data packet is drained from the top of the receive FIFO 410, the second EOP detector 425 decrements the counter 420 by one. In one embodiment, the first and second EOP detectors 415 and 425 detect an end of packet by reading a packet header to obtain the packet size and counting the number of units of data that pass through the receive FIFO 410.

To limit the number of asynchronous packets in the receive FIFO 410, a register 440 (or a memory location) is used to provide a programmable upper bound value. The output of the register 440 and the output of the counter 420 are fed to a comparator 435. If the number of asynchronous data packets in the receive FIFO 410 is equal to (or greater than) the upper bound value in the register 440, the output of the comparator 435 is asserted to causes the data packet decoder 405 to assert an acknowledge/busy signal to the 1394 link interface 235. The acknowledge/busy signal is part of the signals between the data packet decoder 405 and the 1394 link interface 235. An acknowledge/busy condition indicates to the 1394 link interface 235 that the data packet decoder 405 received the asynchronous data packet, but that the data packet could not be accepted at this time. The 1394 link interface 235 will then inform the initiator of the asynchronous data packet to re-transmit the data packet. When the number of asynchronous data packets in the receive FIFO 410 falls below (or is equal to) the upper bound value, the output of comparator 435 is deasserted which causes the data packet decoder 405 to deassert the acknowledge/busy signal. As such, the receive FIFO 410 can now again accept asynchronous data packets.

This aspect of the present invention allows a basic input/output system ("BIOS") to adjust 1394 performance on a system by system basis. In addition, this aspect of the present invention enables future designs to leverage the programming registers to simulate various 1394 utilization models in hardware. This will allow design trade-offs to be visualized prior to implementation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. Adapted to a first-in/first-out device (FIFO), a circuit comprising:
   a counter;
   a first end of packet detector coupled to said counter, said first end of packet detector to increment said counter if an end of packet is detected at an input of the FIFO;

a second end of packet detector coupled to said counter, said second end of packet detector to decrement said counter if an end of packet is detected at an output of the FIFO; and a detector circuit coupled to an output of said counter, said detector circuit to request a bus transaction in response to said output of said counter.

2. The circuit of claim 1 further comprising:

an OR gate having a first input coupled to the detector circuit, a second input, and an output; and a signal line coupled to the second input of the OR gate, the signal line having a FIFO full signal thereon, said FIFO full signal being asserted to indicate that the FIFO is filled beyond a predetermined threshold value.

3. The circuit of claim 2 wherein the output of the OR gate is asserted to request a bus transaction in response to said output of said counter being greater than zero and alternatively said FIFO full signal being asserted.

4. The circuit of claim 3 further comprising a DMA engine coupled to the input of the FIFO, said DMA engine to retrieve and place one or more data packets in said FIFO.

5. The circuit of claim 4 wherein a data packet has a length that is greater than a depth of the FIFO.

6. A method of reducing under-run errors in a first-in/first-out ("FIFO"), comprising:

receiving at least a portion of a data packet in the FIFO;

monitoring an input of the FIFO to detect an end of the data packet; and asserting a request line to transmit the data in the FIFO if the end of the data packet is detected.

7. The method of claim 6 further comprising monitoring an output of the FIFO to detect the end of the data packet at an output of the FIFO.

8. The method of claim 6 further comprising de-asserting the request line if the end of the data packet is detected at an output of the FIFO and an end of a subsequent data packet is not detected at the input of the FIFO.

9. The method of claim 6 further comprising asserting the request line if the FIFO is filled beyond a predetermined threshold.

10. The method of claim 6 wherein monitoring the input of the FIFO comprises:

detecting a header of the data packet that is received by the FIFO;

determining the size of the data packet in response to detecting the header of the data packet; and counting the number of units of data received by the FIFO.

11. Adapted to a first-in/first-out device (FIFO), a circuit comprising:

a counter;

a first end of packet detector coupled to a first input of said counter, said first end of packet detector to increment said counter if an end of packet is detected at an input of the FIFO;

a second end of packet detector coupled to a second input of said counter, said second end of packet detector to decrement said counter if an end of packet is detected at an output of the FIFO;

a register to be loaded with a predetermined value; and a comparator to compare a count value provided by said counter and the predetermined value provided by said register and to assert an acknowledge busy signal in response thereto.

12. The circuit of claim 11 wherein said comparator asserts said acknowledge busy signal if said count value is equal to said predetermined value and alternatively if said count value is greater than said predetermined value.

13. The circuit of claim 12 further comprising a DMA engine coupled to the output of the FIFO, said DMA engine to drain one or more data packets from the FIFO.

14. The circuit of claim 13 wherein each of the one or more packets includes asynchronous data and alternatively isochronous data.

15. The circuit of claim 14 further comprising a data packet detector coupled to the input of said FIFO, said data packet detector to transmit said one or more data packets to said FIFO if said one or more data packets are addressed to the FIFO, otherwise said data packet detector to ignore said one or more data packets.

16. A method of preventing data over-run errors in a first-in/first-out ("FIFO"), comprising:

monitoring an input of the FIFO for an end of packet to determine a number of data packets received;

monitoring an output of the FIFO for an end of packet to determine a number of data packets drained; and asserting a busy acknowledge signal if the difference between the number of data packets received and the number of data packets drained is greater than and alternatively equal to a predetermined value.

17. The method of claim 16 further comprising de-asserting said busy acknowledge signal if the difference between the number of data packets received and the number of data packets drained is less than said predetermined value.

18. The method of claim 17 wherein said predetermined value is user programmable.

19. The method of claim 16 wherein asserting a busy acknowledge signal comprises asserting a busy acknowledge signal to indicate that the FIFO is busy and to prevent further receipt of data packets if the difference between the number of data packets received and the number of data packets drained is greater than and alternatively equal to the predetermined value.

20. The method of claim 16 wherein monitoring the input of the receive FIFO comprises:

detecting a header of the packet;

determining a size of the packet responsive to detecting the header of the packet; and counting a number of units of data to determine the end of the packet.

21. A computer system, comprising:

a first bus;

a second bus; and a circuit coupled between the first and second buses, the circuit including, a first-in/first-out device (FIFO), a counter, a first end of packet detector coupled to said counter, said first end of packet detector to increment said counter if an end of packet is detected at an input of the FIFO, a second end of packet detector coupled to said counter, said second end of packet detector to decrement said counter if an end of packet is detected at an output of the FIFO, and a detector circuit coupled to an output of said counter, said detector circuit to request a bus transaction on the second bus in response to said output of said counter.

22. The computer system of claim 21 wherein the first bus comprises a peripheral component interconnect bus.

23. The computer system of claim 21 wherein the second bus comprises a serial bus.

24. The computer system of claim 21 wherein the circuit further comprises:
   an OR gate having a first input coupled to the detector circuit, a second input, and an output; and
   a signal line coupled to the second input of the OR gate, the signal line having a FIFO full signal thereon, said FIFO full signal being asserted to indicate that the FIFO is filled beyond a predetermined threshold value.

25. The computer system of claim 21 wherein the circuit further comprises a DMA engine coupled to the first bus and the input of the FIFO, said DMA engine to place said packet received from a device on the first bus in said FIFO.

26. A computer system comprising:
   a first bus;
   a second bus; and
   a circuit coupled between the first and second buses, the circuit including,
      a first-in/first-out device (FIFO),
      a counter,
      a first end of packet detector coupled to a first input of said counter, said first end of packet detector to increment said counter if an end of packet is detected at an input of the FIFO,
      a second end of packet detector coupled to a second input of said counter, said second end of packet detector to decrement said counter if an end of packet is detected at an output of the FIFO,
      a register to be loaded with a predetermined value, and
      a comparator to compare a count value provided by said counter and the predetermined value provided by said register and to assert an acknowledge busy signal on the second bus in response thereto.

27. The computer system of claim 26 wherein the first bus comprises a peripheral component interconnect bus.

28. The computer system of claim 26 wherein the second bus comprises a serial bus.

29. The computer system of claim 26 wherein the circuit further comprises a DMA engine coupled to the output of the FIFO and the first bus, said DMA engine to drain one or more data packets from the FIFO to a device on the first bus.

30. The computer system of claim 26 wherein the circuit further comprises a data packet detector coupled to the input of said FIFO and the second bus.

* * * * *